July 5, 1932. S. A. GILL 1,866,204
CORNSTALK FIBER COMPOSITION
Filed March 3, 1928
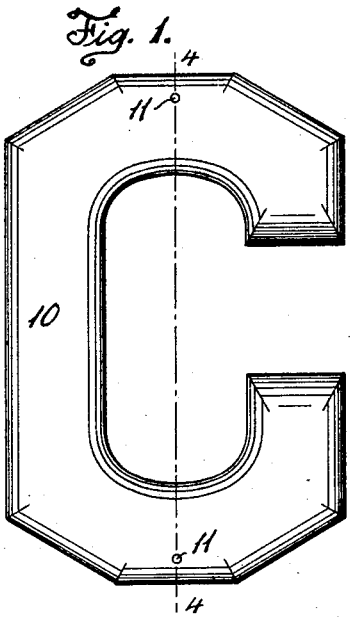
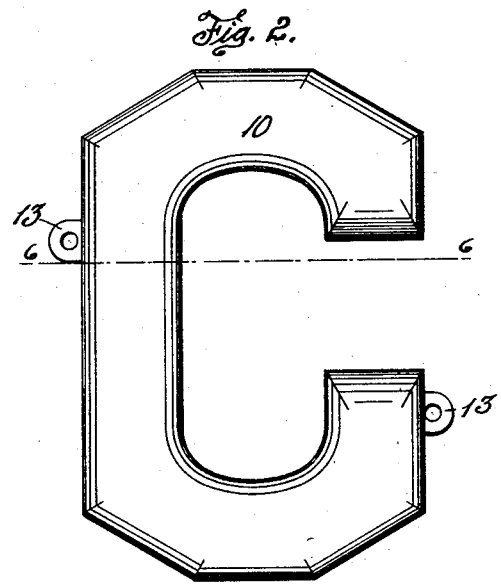
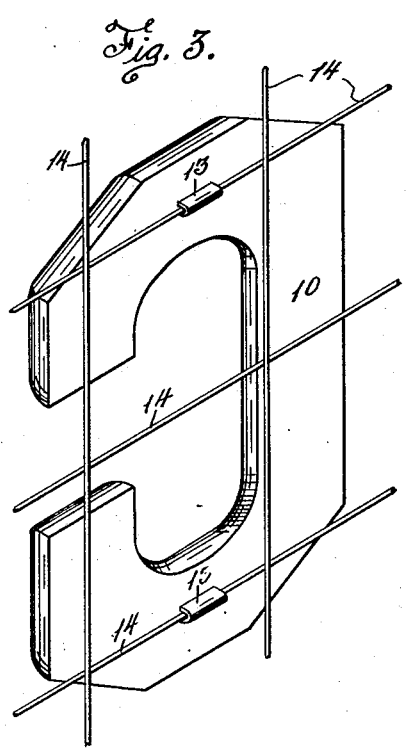
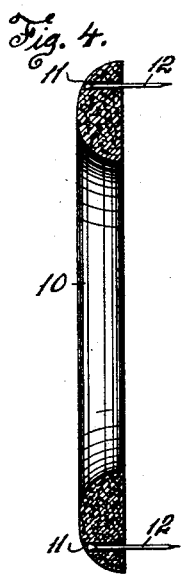
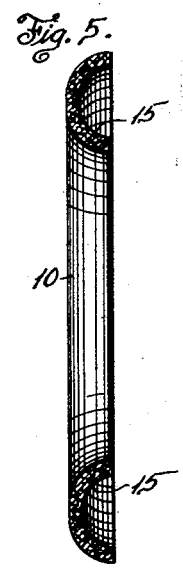
Inventor:
Samuel A. Gill.
By
Attorney.

Patented July 5, 1932

1,866,204

UNITED STATES PATENT OFFICE

SAMUEL A. GILL, OF AMES, IOWA, ASSIGNOR OF ONE-HALF TO ZAC D. DUNLAP AND HARRY B. DUNLAP, BOTH OF AMES, IOWA

CORNSTALK FIBER COMPOSITION

Application filed March 3, 1928. Serial No. 258,962.

This invention relates to a composition of matter and to articles made therefrom and has as an object the provision of a composition of matter adapted for use in the manufacture of various articles, which composition of matter is a mixture of various ingredients of moderate price and ready procurement, plastic and inert in its partly finished or mixed state and susceptible of being shaped and moulded.

A further object of the invention is to provide a composition of matter which is plastic and inert in its partly finished or mixed state and dry and rigid after being heat treated.

A further object of the invention is to provide a composition of matter which is plastic in its partly finished or mixed state and rigid in its finished state, and which, when finished, does not absorb moisture.

A further object of the invention is to be found in the provision of a composition of matter which is plastic in its primary stage of manufacture and susceptible of being moulded while in that stage, but which becomes rigid and dry through heat treating and which, when heat treated, has dielectric properties and a surface susceptible of tool working.

A further object of the invention is to be found in the provision of a composition of matter which is plastic in its primary stage of manufacture and susceptible of being moulded while in that stage and which, when heat treated, presents a surface susceptible of being painted, gilded or otherwise finished.

A further object of the invention is to provide articles of manufacture formed of cornstalk fiber composition.

A further object of the invention is to provide fastening or securing means in combination with articles formed of cornstalk fiber composition.

My invention consists in the construction, arrangement and combination of elements hereinafter set forth, pointed out in my claims and illustrated by the accompanying drawing, in which—

Figure 1 is a front elevation of a sign letter formed of cornstalk fiber composition. Figure 2 is a front elevation of a sign letter similar to Figure 1 but showing different fastening means. Figure 3 is an isometric rear view of a sign letter similar to the showing of Figures 1 and 2 but illustrating further modified fastening means. Figure 4 is a vertical section on the indicated line 4—4 of Figure 1. Figure 5 is a vertical section similar to Figure 4 but illustrating certain modifications of construction. Figure 6 is a horizontal section on the indicated line 6—6 of Figure 2.

The showing of the drawing is limited to a sign letter formed of cornstalk fiber composition, the said composition being particularly adapted for such use, but the composition is adaptable to a wide variety of uses and may be employed in the manufacture of many articles, especially those wherein inherent dryness, dielectric properties, absence of splitting and checking tendencies and susceptibility of moulding are important factors, hence it is to be understood that the showing is purely illustrative and in no sense limitative.

In the development of my invention, a dry mixture of shredded asbestos, shredded cornstalk or cane fiber and sawdust is prepared and mixed with a solution of celluloid an acetone to which a binding and retarding agent such as gold size or banana oil has been added, the resulting mixture being a plastic mass susceptible of being readily shaped or moulded. The dry mixture, or filler, comprises some forty per cent, by weight, of the completed mixture, the celluloid, acetone and gold size or banana oil making up the remaining sixty percent of the weight, the relative proportions of the various ingredients, by weight, being substantially as follows:— asbestos fiber thirty parts, cornstalk or cane fiber eight parts, sawdust or wood flour two parts, celluloid fifteen parts, acetone thirty-six parts and gold size or banana oil nine parts. With the mixture prepared as above set forth, pressure moulds adapted to form the desired articles are filled with the mixture and the moulds and contents subjected to a relatively moderate heat for an hour or more, during which time the mixture sets and becomes rigid, taking the form of the mould, and is thoroughly dried, so that, when the moulds are opened, finished articles are found therein of a composition that may be worked with wood tools, that will not absorb water, split or check, that is dielectric and that presents a surface susceptible of being painted, gilded, enameled or otherwise finished. The use of the gold size or banana oil is optional, as either of these ingredients acts as a binder and retarder in the mixture. If a more plastic consistency of the mixture is desired, linseed oil may be added to the ingredients set forth, such addition serving likewise to further retard the time of setting of the mixture and requiring that the heat treating be continued for a longer period of time than when the linseed oil is omitted.

Referring to the drawing, Figure 1 shows a sign letter formed of the mixture and in the manner above set forth, the numeral 10 designating the completed letter and 11 indicating holes moulded or drilled through said letter for the insertion of nails or screws 12 by means of which the letter may be positioned and secured as desired. In Figures 2 and 6 the holes 11 have been omitted and apertured clips 13, having serrated end portions embedded in the mixture prior to heat treating, are provided as a convenient means for securing the letter to a wall or surface, nails or screws being passed through the apertures in the clips 13. On occasion it may be desirable to mount the letter 10 on wires, wire mesh or rods, in which event unapertured clips 13 may be embedded in the plastic letter prior to heat treating in position to be bent around wires 14, as clearly shown in Figure 3. To conserve material and reduce the weight of the finished article it may be desirable to so form the mould as to provide a recess in the back of the article. This may be readily accomplished in the case of the letter 10 by a ridge or rib in the mould so positioned as to form a channel in the back of the letter as indicated at 15 in Figure 5.

Since the cornstalk fiber composition formed as above described is adaptable to a wide variety of uses and has properties of value in the manufacture of many articles, I wish to be understood as being in no sense limited by the showing of the drawing or the wording of the foregoing description, but solely by the scope of the appended claims.

I claim as my invention—

1. A composition of matter wherewith may be produced articles of manufacture that are non-elastic, hard, light in weight, dielectric, waterproof and susceptible of being worked and finished like wood, said composition comprising in intimate mixed relation celluloid, acetone, vegetable fiber, asbestos fiber, sawdust and gold size.

2. A composition of matter wherewith may be produced articles of manufacture that are non-elastic, hard, light in weight, dielectric, waterproof and susceptible of being worked and finished like wood, said composition comprising in intimate mixed relation the following ingredients in substantially the proportions, by weight, set forth;—vegetable fiber eight parts, asbestos fiber thirty parts, sawdust two parts, celluloid fifteen parts, acetone thirty-six parts and gold size nine parts.

3. A composition of matter wherewith may be produced articles of manufacture that are non-elastic, hard, light in weight, dielectric, waterproof and susceptible of being worked and finished like wood, said composition comprising in intimate mixed relation a dry-mixed filler constituting substantially forty percent, by weight, of the completed mixture and a wet-mixed binder and retarder constituting substantially sixty per cent of the completed mixture, said filler comprising a mixture, by weight, of eight parts of vegetable fiber, thirty parts of asbestos fiber and two parts of sawdust and said binder and retarder comprising a mixture, by weight, of fifteen parts of celluloid, thirty-six parts of acetone and nine parts of gold size.

4. Articles of manufacture having the properties hereinbefore described and formed of a mixture of celluloid, acetone, gold size, vegetable fiber, asbestos fiber, sawdust; said mixture being heat treated in pressure moulds.

5. Articles of manufacture having the properties hereinbefore described and formed of the following mixture in substantially the proportions by weight set forth;—vegetable fiber eight parts, asbestos fiber thirty parts, sawdust two parts, celluloid fifteen parts, acetone thirty-six parts and gold size nine parts.

6. As an article of manufacture, a sign letter having the properties hereinbefore described and formed of a filler, a binder and a retarding agent comprising the ingredients and proportions by weight as set forth; vegetable fiber eight parts, asbestos fiber thirty parts, sawdust two parts, celluloid fifteen parts, acetone thirty-six parts and gold size nine parts.

In witness whereof I affix my signature.

SAMUEL A. GILL.